(12) United States Patent
Schroeter et al.

(10) Patent No.: US 9,005,797 B2
(45) Date of Patent: Apr. 14, 2015

(54) BATTERY WITH A STACK OF BIPOLAR INDIVIDUAL BATTERY CELLS

(75) Inventors: Dirk Schroeter, Winnenden (DE); Jens Meintschel, Bernsdorf (DE); Martin Ertle, Abtsgmuend (DE); Rainer Kaufmann, Stuttgart (DE); Claudia Brasse, Meerbusch (DE); Claus-Rupert Hohenthanner, Hanau (DE); Joerg Kaiser, Eggenstein (DE)

(73) Assignee: Daimler AG, Stuttgart (DE)

( * ) Notice: Subject to any disclaimer, the term of this patent is extended or adjusted under 35 U.S.C. 154(b) by 435 days.

(21) Appl. No.: 13/387,805

(22) PCT Filed: Jul. 3, 2010

(86) PCT No.: PCT/EP2010/004038
§ 371 (c)(1),
(2), (4) Date: Mar. 27, 2012

(87) PCT Pub. No.: WO2011/012202
PCT Pub. Date: Feb. 3, 2011

(65) Prior Publication Data
US 2012/0177977 A1     Jul. 12, 2012

(30) Foreign Application Priority Data
Jul. 31, 2009   (DE) .......................... 10 2009 035 495

(51) Int. Cl.
*H01M 2/04*     (2006.01)
*H01M 10/058*   (2010.01)
(Continued)

(52) U.S. Cl.
CPC .......... *H01M 2/0212* (2013.01); *H01M 2/0426* (2013.01); *H01M 2/0245* (2013.01);
(Continued)

(58) Field of Classification Search
CPC .......... H01M 10/0585; H01M 2/0212; H01M 2/0245; H01M 2/0275; H01M 2/0426; H01M 2/0285
USPC ......................................... 429/153
See application file for complete search history.

(56) References Cited

U.S. PATENT DOCUMENTS 8,383,261 B2     2/2013   Mizuta et al.
2004/0175611 A1* 9/2004   Otohata et al. ................ 429/127
(Continued)

FOREIGN PATENT DOCUMENTS

CN     101395490 A     3/2009
CN     101405894 A     4/2009
(Continued)

OTHER PUBLICATIONS

Chinese Office Action with partial English translation dated Nov. 5, 2013 (6 pages).
(Continued)

*Primary Examiner* — Jonathan Jelsma
(74) *Attorney, Agent, or Firm* — Crowell & Moring LLP

(57) ABSTRACT

A battery includes a stack of bipolar individual battery cells, each of which includes an electrode stack and two sheet metal covers bounding the individual battery cell at least in the stacking direction. The electrode stack is connected to at least one of the sheet metal covers by at least one weld. In the region of the at least one weld, the sheet metal cover welded to the electrode stack and/or the sheet metal cover of the adjacent individual battery cell in contact with the sheet metal cover is/are of a set-back design. As a result, the sheet metal covers of adjacent individual battery cells do not have any contact in the region of the at least one weld.

6 Claims, 6 Drawing Sheets

(51) Int. Cl.
*H01M 2/02* (2006.01)
*H01M 2/26* (2006.01)
*H01M 10/04* (2006.01)
*H01M 10/0525* (2010.01)
*H01M 10/0585* (2010.01)
*H01M 6/48* (2006.01)

(52) U.S. Cl.
CPC ............ *H01M2/0285* (2013.01); *H01M 2/027* (2013.01); *H01M 2/0275* (2013.01); *H01M 2/266* (2013.01); *H01M 6/48* (2013.01); *H01M 10/0436* (2013.01); *H01M 10/0525* (2013.01); *H01M 10/0585* (2013.01); *Y02E 60/122* (2013.01)

(56) References Cited

U.S. PATENT DOCUMENTS

| | | | |
|---|---|---|---|
| 2005/0106453 A1* | 5/2005 | Yamauchi et al. | ............ 429/166 |
| 2006/0088761 A1 | 4/2006 | Ota et al. | |
| 2008/0305394 A1* | 12/2008 | Hisamitsu et al. | ............ 429/209 |
| 2010/0021802 A1 | 1/2010 | Yang et al. | |
| 2011/0117418 A1 | 5/2011 | Meintschel et al. | |

FOREIGN PATENT DOCUMENTS

| | | |
|---|---|---|
| DE | 10 2007 063 180 A1 | 9/2008 |
| DE | 10 2007 063 181 A1 | 2/2009 |
| WO | WO 2007/063877 A1 | 6/2007 |
| WO | WO 2009/018942 A1 | 2/2009 |

OTHER PUBLICATIONS

PCT/ISA/237 Form (Five (5) pages).

International Search Report including English translation dated Oct. 5, 2010 (Seven (7) pages).

* cited by examiner

BATTERY WITH A STACK OF BIPOLAR INDIVIDUAL BATTERY CELLS

BACKGROUND AND SUMMARY OF THE INVENTION

The invention relates to a battery with a stack of bipolar individual battery cells of the type defined in greater detail in the preamble of claim 1.

Batteries represented by a stack of bipolar individual battery cells are generally known. The cells are stacked on top of one another and typically clamped together, so that one terminal post comes to lie on one side of the stack of bipolar individual battery cells, while the other terminal post lies on the other side of the stack of bipolar individual battery cells. Such individual battery cells are, for example, described in the German application number DE 10 2007 063 181.4. The individual battery cells are designed as so-called frame flat cells with two sheet metal covers, which are electrically isolated from each other by an insulating frame. The sheet metal covers serve as the terminals of the individual battery cell and as heat-conducting plates that divert the waste heat generated in the battery to the outside of the individual battery cell. There, the sheet metal covers may, for example, be connected to a cooling apparatus that is typically cooled actively by a cooling fluid or by the refrigerant of an air conditioning system.

In the interior of the individual battery cell, i.e., between the sheet metal covers and surrounded by the electrically insulating frame, the electrochemically active materials are located. These typically consist of a stack of electrodes. This electrode stack comprises anode and cathode foils, separated by an electrically insulating separator placed in between, which are alternately stacked on top of one another. At the edges of the metallic foils, the anode foils project on one side, while the cathode foils project on the other side. These regions, which are designated as current-carrying lugs in the above application, are then suitably connected to one another. This may, for example, be achieved by welding as described in the above application. As connecting regions of the electrode stack, these regions are further electrically connected to the respective sheet metal cover. This, too, can be achieved by welding according to the above application. The individual battery cell is then completed by way of the frame and the two sheet metal covers and assembled. In this process, the individual battery cell is sealed against the environment. The interior of the frame is then filled with a suitable electrolyte which, together with the electrode stack, forms the chemically active part of the individual battery cell.

In lithium ion batteries, the anode or cathode foils respectively are typically represented by aluminum or copper foils, and a liquid electrolyte containing lithium ions is typically used as an electrolyte.

In order to connect the respective electrode foils to the respective sheet metal cover, a suitable welding method is used. This welding of the electrode foils or of their connecting regions to the respective sheet metal covers is disadvantageous because material is typically thrown up or raised in the region of the welds, which then prevents a flat contact between one individual battery cell and the sheet metal cover of the adjacent individual battery cell. Corresponding surface irregularities in the material will also be found on the side of the electrode stack. However, this is irrelevant here, because this structure is distanced from the opposite sheet metal cover by the electrolyte-filled region of the individual battery cell.

In order to obtain a flat contact of the sheet metal covers of adjacent individual battery cells even in the weld region, some reworking is required, which makes production complicated and expensive. If the projecting regions of the welds were simply left on the sheet metal covers, the result would be an uncontrolled air gap at this point as well as a point contact between the sheet metal covers and the thrown-up material of the welds. At the relatively high voltages in the stack of individual battery cells, this may even result in sparking in this region. This has to be avoided at all costs if the structure is not to be damaged accordingly.

Exemplary embodiments of the present invention are directed to a battery with a stack of individual battery cells, which avoids the disadvantages described above and which allows for a structure which can be implemented simply and cost-effectively.

According to the invention, the sheet metal cover welded to the electrode stack and/or the opposite sheet metal cover of the adjacent individual battery cell is/are set back in the region of the weld. This creates a distance between the two adjacent sheet metal covers at least in the region of the weld. In the region of the weld, these can then no longer contact one another, so that a reworking of the welds can be omitted without having to risk the above disadvantages. In principle, it is possible to set back only the sheet metal cover with the weld in this region and to leave the opposite sheet metal cover straight, or vice versa. It would also be conceivable to set back both sheet metal covers in a suitable manner.

In this context, it is irrelevant whether both of the sheet metal covers are welded to the electrode stack, which will typically be the case, or whether only one of the sheet metal covers is welded to the electrode stack and the other sheet metal cover is electrically connected to the electrode stack by other means. A variant according to the invention can be used even if there is only one weld.

In a particularly useful further development of the invention, the sheet metal covers and the electrode stack are joined by a pressure welding process. In this method, for example in ultrasonic welding or resistance pressure welding, the electrode geometry is to some extent impressed into the region of the welded components. In ultrasonic welding, for example, this may be a ribbed or knurled surface of the sonotrode and/or the anvil. These pressure welding methods, on the other hand, offer the advantage that different materials can be welded to one another. As, for example in the construction of the individual battery cell with a lithium ion cell chemistry, sheet metal covers made, for example, of iron-based materials have to be welded to aluminum foil anodes or copper foil cathodes, this advantage of pressure welding is critical in the production of such individual battery cells. The production of individual battery cells can therefore be simplified, which makes the production of the battery itself more cost-effective.

Advantageous further developments of the invention can be derived from the remaining dependent claims and from the following description of the embodiments with reference to the figures.

BRIEF DESCRIPTION OF THE DRAWING FIGURES

DETAILED DESCRIPTION

Figure 1:
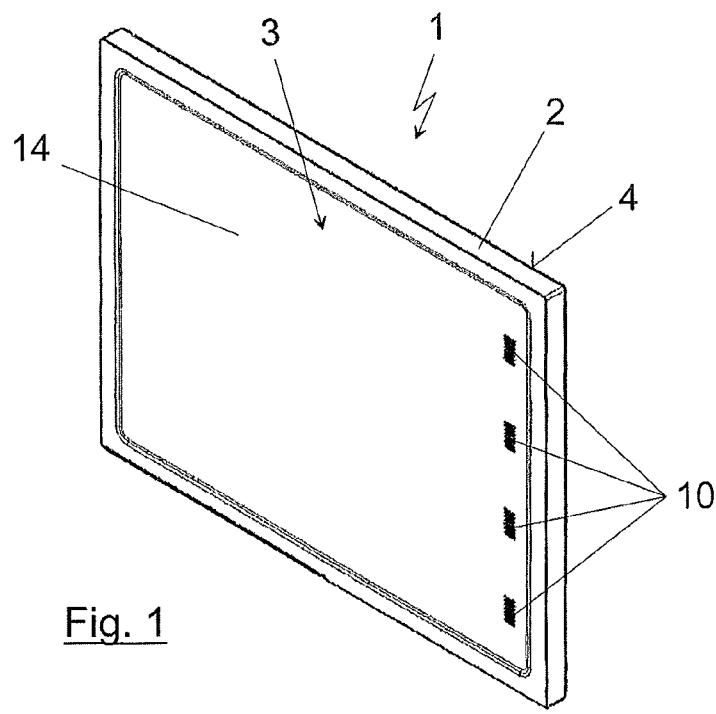
FIG. 1 is a three-dimensional view of an individual battery cell according to the invention.

In FIG. 1, an individual battery cell 1 can be seen in a three-dimensional view. It comprises an electrically insulating frame 2, a first sheet metal cover 3 and a second sheet metal cover 4, which is located on the opposite side of the frame 2.

Figure 2:
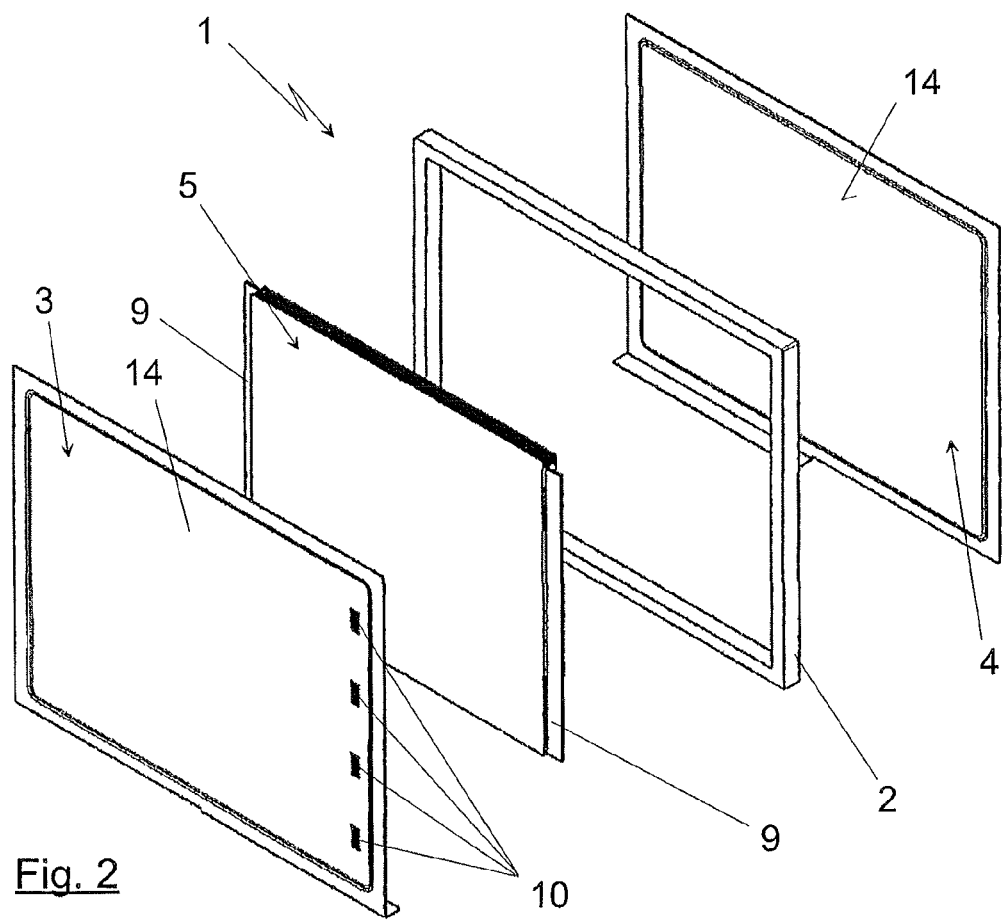
FIG. 2 is an exploded view of the individual battery cell according to FIG. 1.
Figure 7:
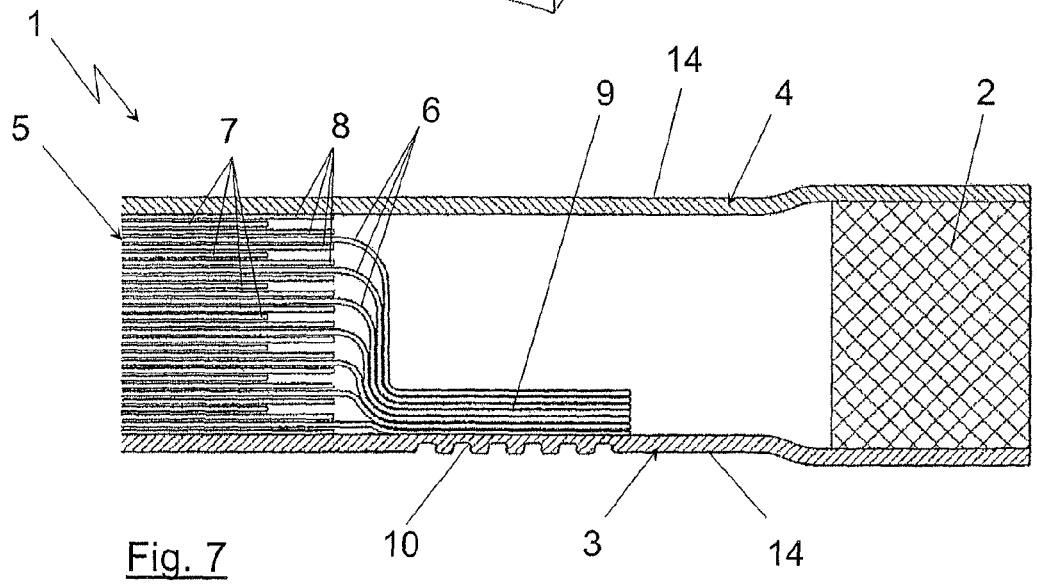
FIG. 7 is a section through an individual battery cell according to the invention.

FIG. 2 is an exploded view of the same structure in which, in addition to the sheet metal covers 3, 4 and the frame 2, an electrode stack 5 can be seen. This electrode stack 5 is made up from anode foils 6 and cathode foils 7 with separators 8 placed in between. This structure is not recognizable in FIG. 2, but can be derived from the enlarged section of FIG. 7. The anode foils 6 and cathode foils 7 are stacked alternately, with an electrically insulating separator 8, typically also a foil material, placed between each anode foil 6 and cathode foil 7. On one side of the electrode stack 5, the anode foils 6 are led out therefrom, on the other side the cathode foils 7. These regions form the electric connecting regions 9, which can be seen in FIG. 2 as well. These electric connecting regions 9 are welded to the respective sheet metal cover 3, 4. This is indicated in FIGS. 1 and 2 in the region of the first sheet metal cover 3, for example the anode, by the respective welds 10.

Figure 3:
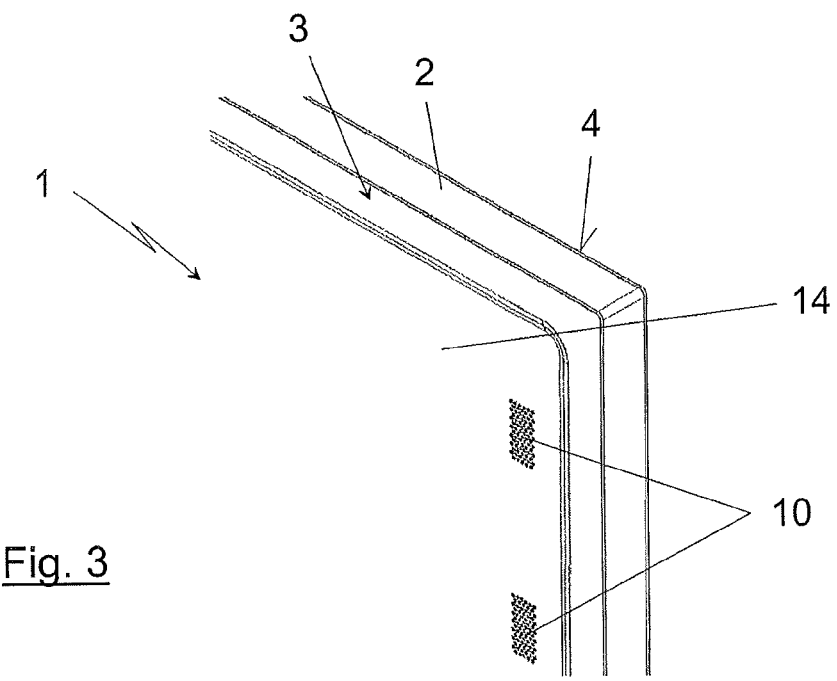
FIG. 3 is an enlarged section of the view according to FIG. 1.
Figure 4:
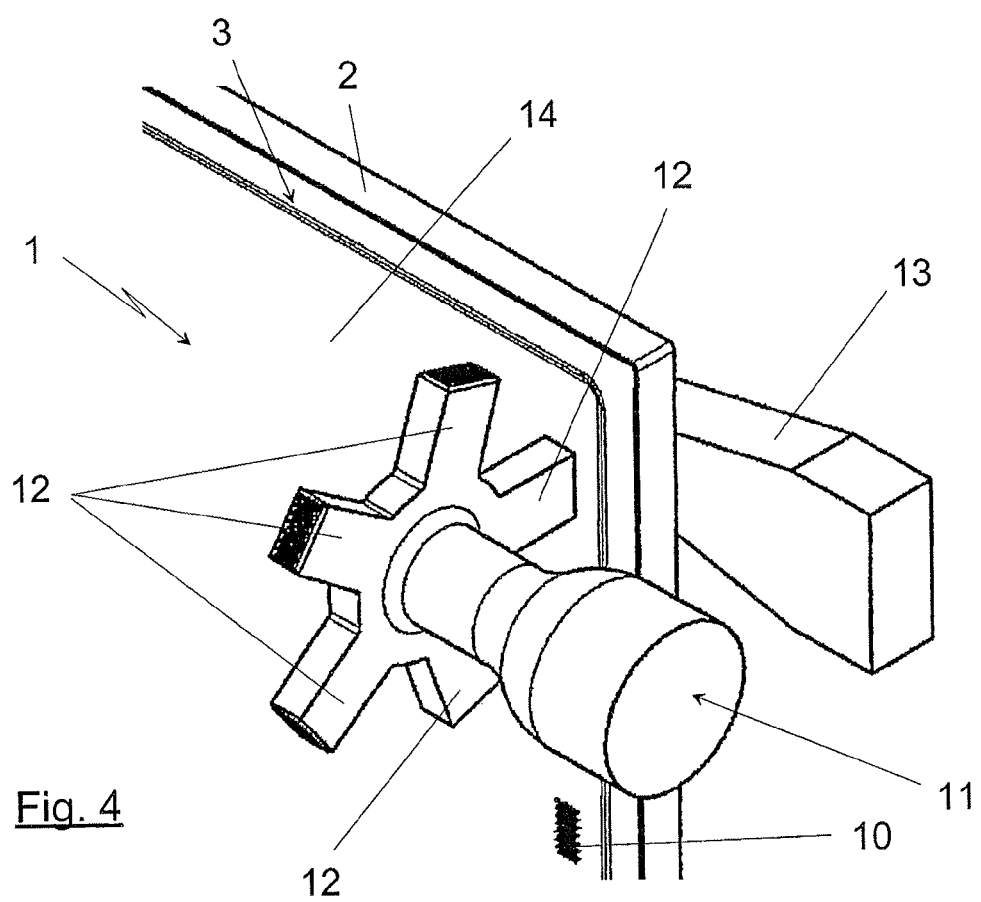
FIG. 4 is a three-dimensional view of the individual battery cell according to FIG. 1 while a sheet metal cover is welded to the electrode stack.
Figure 5:
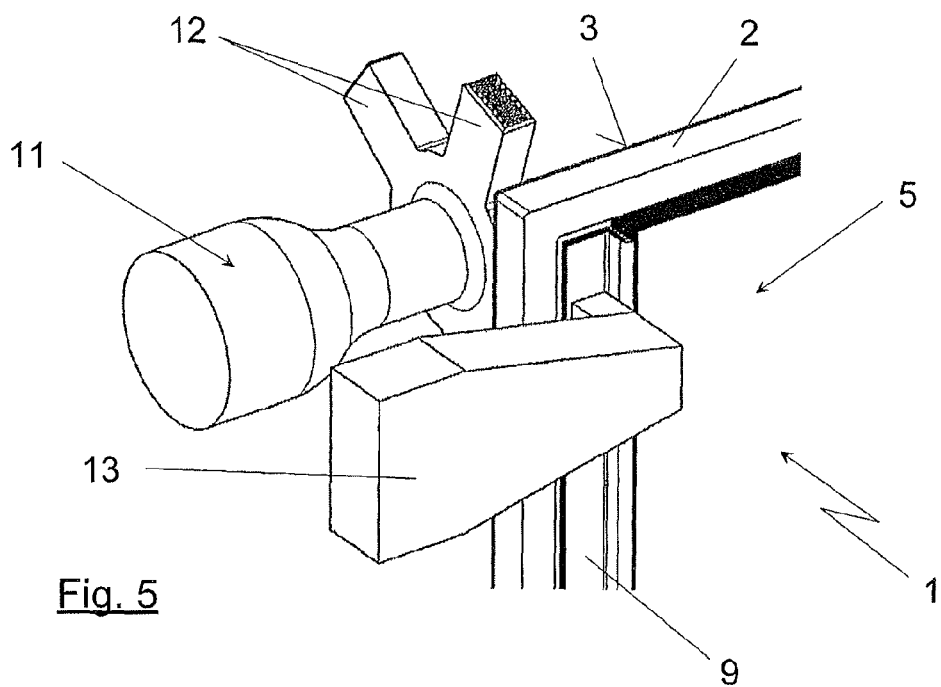
FIG. 5 is the view according to FIG. 4 from another angle.
Figure 6:
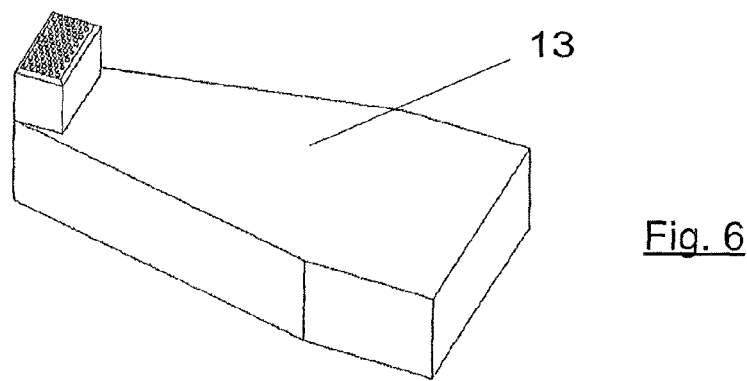
FIG. 6 is a detailed view of the anvil from FIGS. 4 and 5.

In the enlarged view of FIG. 3, two of these welds 10 are shown again in detail. The welds 10 have an uneven surface. The shape of the surface is determined by the preferred welding method. The electric connecting regions 9 of the electrode stack 5 can, for example, be welded to the respective sheet metal covers 3, 4 by means of pressure welding, for example ultrasonic welding. In the illustrations of FIGS. 4 and 5, the welding of the electric connecting region 9 of the electrode stack 5 to the first sheet metal cover 3, which is already joined to the frame 2, is shown by way of example. In FIG. 4, the so-called sonotrode 11 of the ultrasonic welding apparatus can be seen. The sonotrode 11 on one side of the components 3, 9 to be welded has a plurality of welding heads 12 in the illustrated embodiments. In the embodiment shown in FIG. 4, one of the welding heads 12 is in operation. It acts together with an anvil 13 provided on the other side of the components 3, 9 to be welded. This can be seen in FIG. 5. In the welding process, the sonotrode 11 is moved by means of high-frequency ultrasound, while the two components 3, 9 are clamped between the sonotrode 11 and the anvil 13. The high-frequency ultrasonic movement of the sonotrode 11 or its welding heads 12 respectively results in a strong heating of the clamped materials and thus in a type of friction welding. In order to introduce the necessary heat into the components 3, 9 to be welded as effectively as possible, the welding head 12 and the anvil 13 have a suitably rough surface. This is shown once again in FIG. 6, using the anvil 13 as an example.

The region of the anvil 13 lying opposite the welding head 12 of the sonotrode 11 is suitably roughened and, for example, provided with a toothing, a knurling or the illustrated nap pattern. This nap pattern, which may also be formed on the welding head 12 of the sonotrode 11, ensures a good transmission of frictional forces and thus a correspondingly good heating of the components 3, 9 to be welded. Such an ultrasonic welding method, similar to other pressure welding methods, offers the advantage that different materials can be welded to one another. In the illustrated embodiment, for examples, an iron-based material of the first sheet metal cover 3 is welded to the aluminum of the anode foils.

On the other hand, such pressure welding methods have the disadvantage that the required surface texture of the anvil 13 or the sonotrode 11 respectively is impressed into the welded components 3, 9, resulting in an uneven surface and the throwing up of materials. This can be seen in the preceding figures, where the welds 10 can be recognized on the components. In the sectional view of FIG. 7, this is once again illustrated schematically. Only the deformation in the region of the first sheet metal cover 3, which is relevant to the invention, is shown. A comparable deformation will also develop on the side of the connecting region 9 that is opposite the sheet metal cover 3. As this projects into the region of the individual battery cell 1 that has no function or is filled with the electrolyte, this does not matter, so that the situation is not illustrated in FIG. 7. In addition to the material thrown up in the region of the weld 10, the sectional view of FIG. 7 once again shows the electrode stack 5 with its detailed structure of anode foils 6, cathode foils 7 and separators 8 arranged in between.

Figure 8:
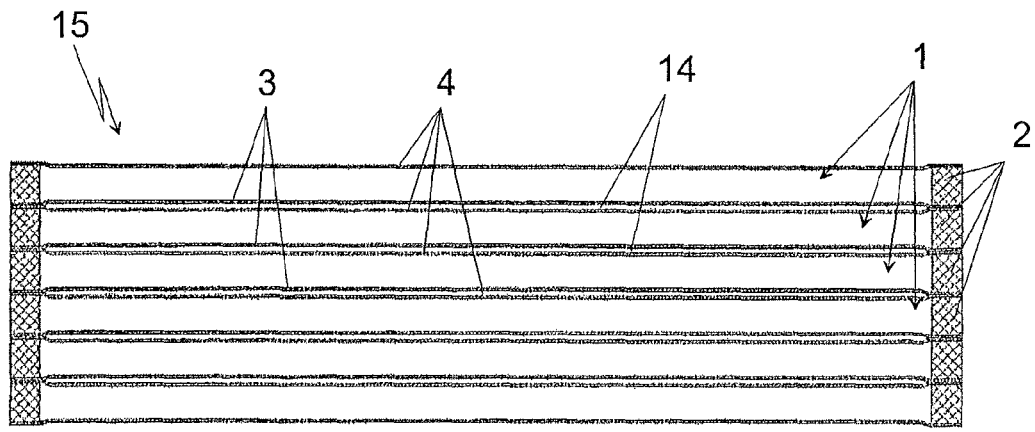
FIG. 8 is a sectional view of a stack of individual battery cells.

In conventional sheet metal covers 3, 4 of prior art, which are perfectly flat in the stacking direction of the individual battery cells 2, the material thrown up in the region of the welds 10 can result in a corresponding deformation or a point contact only between the sheet metal covers 3, 4 of adjacent individual battery cells 2. This is avoided in the illustrated embodiment by providing that the sheet metal covers 3, 4 are set back against their region which most closely faces the adjacent individual battery cells 1 in the region where the welds 10 are to be provided. This may, for example, be achieved by suitably embossing the sheet metal covers 3, 4 into the region within the frame 2. These set-back regions 14 within the frame 2 can already be seen in FIGS. 1, 2, 3, 4 and 7. If the individual battery cells 1 are now stacked to produce the whole battery, the result is a stack 15 of individual battery cells 1 as shown in FIG. 8 by way of example. To simplify the illustration, the individual battery cells 1 are shown in FIG. 8 without the interior of the individual battery cells 1 and without the welds 10. It can, however, be seen clearly that the sheet metal covers 3, 4 of adjacent individual battery cells 1 contact one another in the region of the frame 2. As the anode plate 3 is located on one side of the individual battery cells 1 and the cathode plate 4 on the other side, this creates a serial electric interconnection between the individual battery cells 1 in the stack 15. As the sheet metal covers 3, 4 are not set back in the region of the frame 2, the desired electric contacting is obtained at least in this region when the individual battery cells 1 are stacked.

As also illustrated in FIG. 8, there is an air gap between the set-back regions of the sheet metal covers 3, 4 in the region 14 where the sheet metal covers 3, 4 are set back. As a result, material can be thrown up in the welding process in this set-back region 14 where the welds 10 are located, without this material coming into immediate contact with the opposite sheet metal cover 3, 4 after stacking. This simple measure, wherein the sheet metal covers 3, 4 are suitably set back, results in a simple structure of the individual battery cells 1. These individual battery cells 1 can then easily be assembled to form the stack 15, so that batteries with bipolar individual battery cells 1 can be produced cost-effectively and simply.

Figure 9:
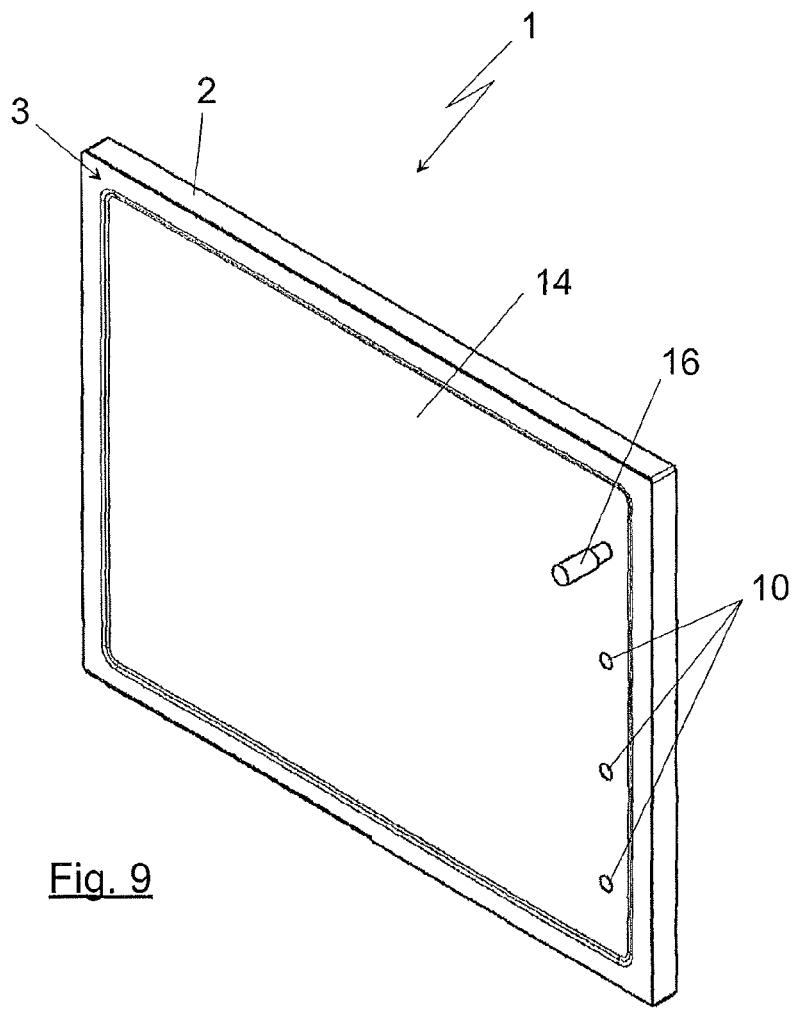
FIG. 9 is a three-dimensional view analogous to FIG. 1, showing an alternative welding method.

The illustration of FIG. 9 shows an alternative embodiment, in which ultrasonic welding has been replaced by a pressure resistance welding process. This method, which is commonly referred to as spot welding, essentially uses only two electrodes 16, of which only one is indicated here by way of example. The components 3, 9 to be welded are clamped between these two electrodes 16, and a suitable current flows through the electrodes 16, melting the clamped materials, so that they can be welded to each other. The electrodes 16 are then removed from the components to be welded. This spot welding method likewise leaves behind typical welds 10, in this case welding spots. Material is likewise thrown up in the region of the welding spots, and some material of the welding electrodes 16 may be left behind owing to wear caused by heating in the welding process. This thrown-up material or the material residue of the electrodes 16 is likewise critical with respect to the flatness of the sheet metal covers and a potential uncontrolled contact or non-contact between the sheet metal covers 3, 4. Similar explanations therefore apply to the spot welding process shown by way of example as to the ultrasonic welding process described above. In view of this, the structure of the sheet metal covers 3, 4 likewise includes a set-back region 14 within the frame 2.

Figure 10:
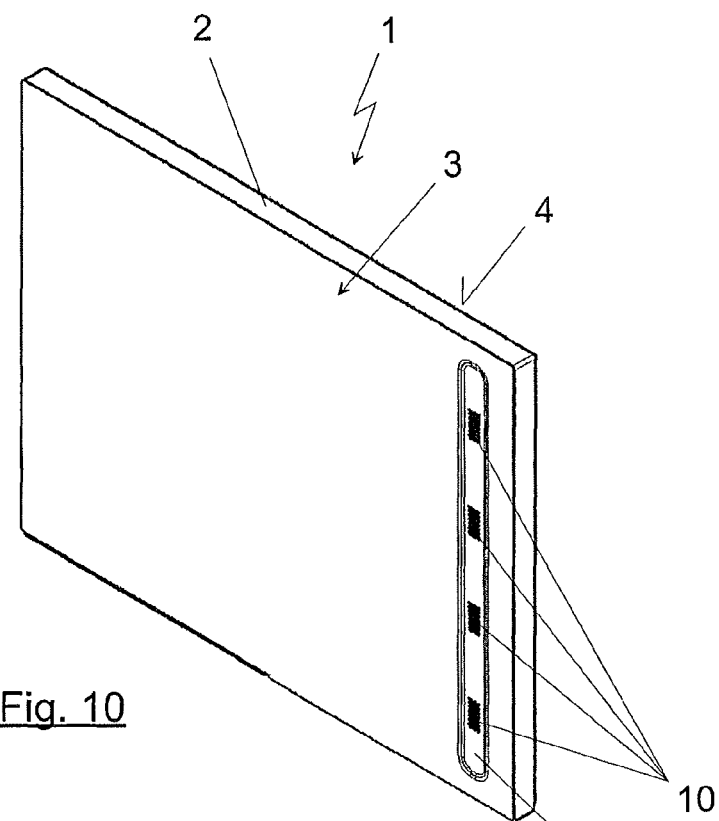
FIG. 10 is a three-dimensional view of an alternative embodiment of an individual battery cell according to the invention.

The illustration of FIG. 10 shows a further alternative structure. Here, too, an ultrasonic welding process has been used, as can be seen from the form of the welds 10. In place of a sheet metal cover 3 that is set back as a whole within the frame 2, the sheet metal cover 3 only has a partially set-back region 14 around the welds 10. This means that only a smaller surface of the sheet metal cover 3 has been set back, for example by stamping, in order to accommodate the welds 10. As a result, a correspondingly advantageous design of the cell stack 15 can be obtained as the individual battery cells 1 are stacked, in which none of the welds 10 touches the opposite sheet metal cover 4. It is nevertheless possible to obtain a comparatively large contact surface between the sheet metal covers 3, 4 and thus a good contacting of the individual battery cells 1. The opposite sheet metal cover may also have a partially set-back region 14 in the region of the welds 10, but it may alternatively be perfectly flat if the set-back region 14 in the first sheet metal cover 3 is deep enough.

Figure 11:
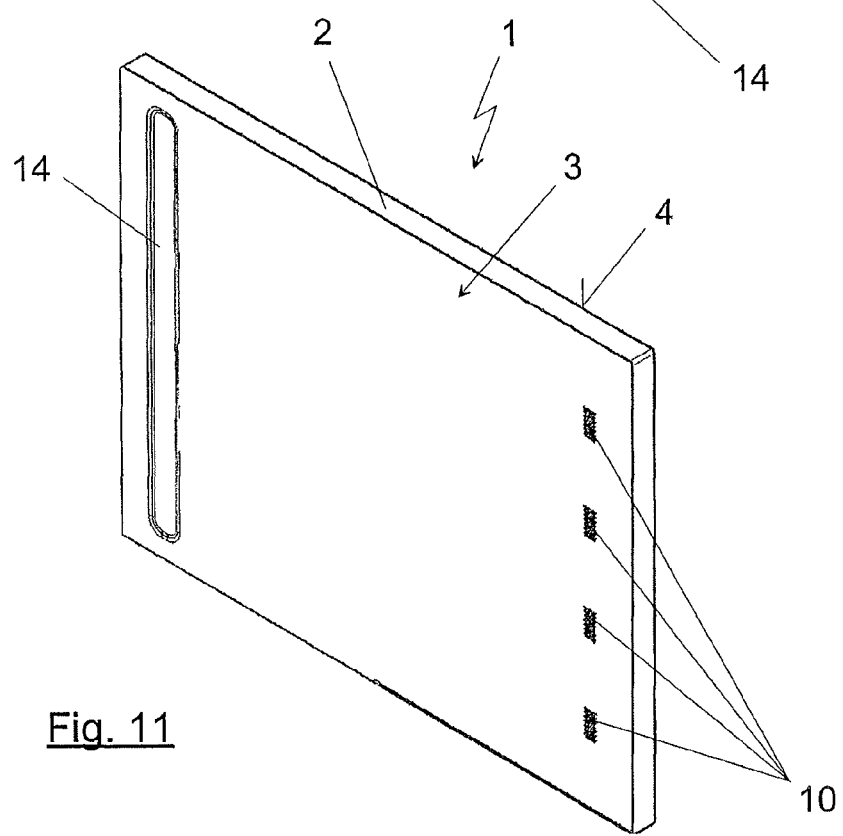
FIG. 11 is a three-dimensional view of a further alternative embodiment of an individual battery cell according to the invention.

FIG. 11 shows a further possible embodiment of the individual battery cell 1. The sheet metal cover 3 shown here is provided with the partially set-back region 14, but not in the region of the welds 10 on the sheet metal cover. In contrast, the welds are formed in a flat region of the sheet metal cover 3 that has not been set back. If the cell stack 14 is now assembled, the first sheet metal cover 3, which here lies in front, comes into contact with the second sheet metal cover 4 on the other side of the frame 2. If this sheet metal cover 4 is of a similar design, this means that, in the illustration of FIG. 11, the corresponding welds 10 in the second sheet metal cover 4 are located opposite the set-back region 14 of the flat sheet metal cover 3. Opposite the welds 10 that can here be seen on the first sheet metal cover 3, a corresponding set-back region 14 is provided in the second sheet metal cover 4. After the individual battery cells 1 have been assembled to form the cell stack 15, a region with the welds 10 on the flat part of the sheet metal cover 3, 4 will therefore always lie above a set-back region 14 of the adjacent sheet metal cover 4, 3.

The design of the sheet metal covers 3, 4 according to FIG. 11 is particularly useful, because it provides an optimal use of the space within the individual battery cell 1. The regions with the welds 10 are flat, so that there is no need for any deformation of the connecting regions 9 of the electrode stack 5. The sheet metal covers are also flat in the region of the electrode stack 5, so that the electrode stack 5 can be implemented even with a maximum overall height. Only in the region opposite of the connecting region 9 of the electrode stack 5 with one of the sheet metal covers 3, 4 is the other sheet metal cover 4, 3 provided with the partially set-back region 14. In this region, however, the interior of the individual battery cells 1 is either empty or filled with electrolyte in any case. The partially set-back region 14 therefore does not require any space which could be used in other ways. On the contrary, it reduces the free volume which would otherwise have to be filled with electrolyte. As a sufficient amount of electrolyte is present in any case, this arrangement offers the additional advantage of potential electrolyte savings.

Figure 12:
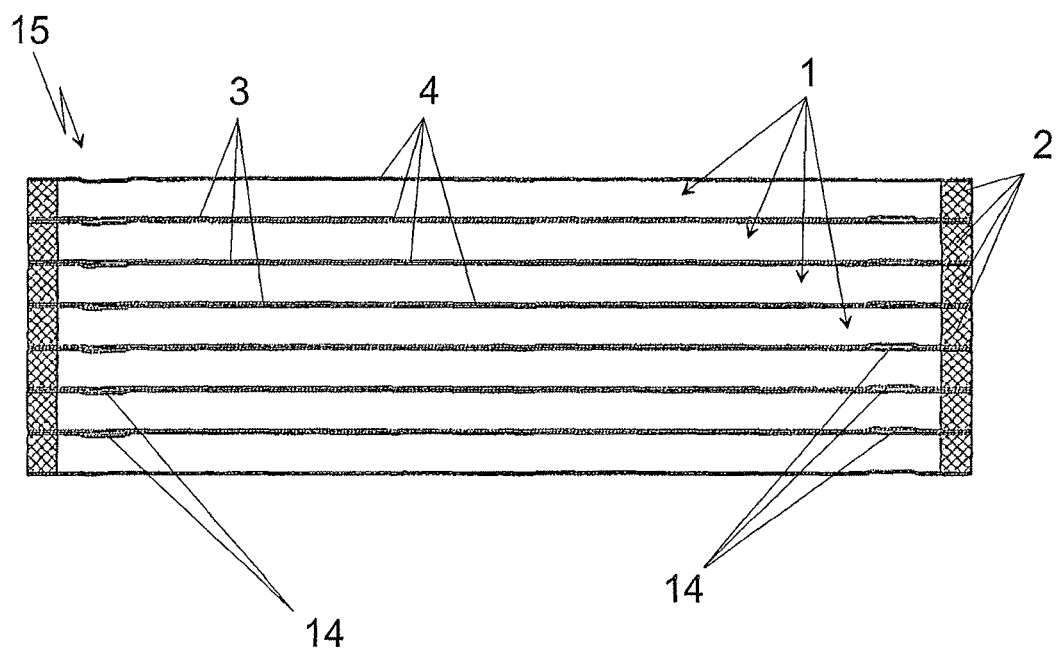
FIG. 12 is a section through a stack of individual battery cells, in the embodiment according to FIG. 10 or FIG. 11.

The structure with the sheet metal covers 3, 4 according to FIG. 10 or 11 can be seen once again in the stack 15 of individual battery cells 1 in FIG. 12; apart from that, the explanations offered in the description relating to FIG. 8 apply to FIG. 12 as well.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A battery comprising:
    a stack of bipolar individual battery cells, wherein each of the individual battery cells comprises
        an electrode stack; and
        two sheet metal covers bounding the individual battery cell at least in a stacking direction,
        wherein the electrode stack is connected to one of the sheet metal covers by at least one weld,
        wherein the sheet metal cover welded to the electrode stack or a sheet metal cover of an adjacent individual battery cell in contact with the sheet metal cover of the electrode stack is configured with a set-back region in a region of the at least one weld so that the sheet metal covers of adjacent individual battery cells do not have any contact in the region of the at least one weld,
        wherein the set-back region is larger than the at least one weld and encompasses the at least one weld,
        wherein the sheet metal covers and the electrode stack are welded together by pressure welding,
        wherein
            the sheet metal cover welded to the electrode stack has a partially set back region only around the at least one weld, or
            the sheet metal cover of the adjacent individual battery cell, which is in contact with the sheet metal cover welded to the electrode stack, has a partially set back region only in a region opposite to and around the at least one weld in the stacking direction.

2. The battery according to claim 1, wherein a frame is arranged between the sheet metal covers, the frame enclosing the electrode stack at right angles to the stacking direction.

3. The battery according to claim 1, wherein the sheet metal covers and the electrode stack are welded together by ultrasonic welding.

4. The battery according to claim 1, wherein the sheet metal covers and the electrode stack are welded together by resistance pressure welding.

5. The battery according to claim 1, wherein the individual battery cells are lithium ion battery cells.

6. The battery according to claim 1, wherein the at least one weld includes at least two welds arranged across a width of the individual battery cell and the set-back region runs across the width in an uninterrupted manner in a region of the at least two welds.

* * * * *